United States Patent
Friel et al.

(10) Patent No.: US 11,233,797 B2
(45) Date of Patent: Jan. 25, 2022

(54) SEAMLESS GUEST ACCESS TO SPACES AND MEETINGS

(71) Applicant: Cisco Technology, Inc., San Jose, CA (US)

(72) Inventors: Owen Brendan Friel, Galway (IE); Oliver W. Fagan, Galway (IE); John Joseph Costello, Galway (IE)

(73) Assignee: CISCO TECHNOLOGY, INC., San Jose, CA (US)

( * ) Notice: Subject to any disclaimer, the term of this patent is extended or adjusted under 35 U.S.C. 154(b) by 241 days.

(21) Appl. No.: 16/430,098

(22) Filed: Jun. 3, 2019

(65) Prior Publication Data

US 2020/0382511 A1 Dec. 3, 2020

(51) Int. Cl.
*H04L 29/06* (2006.01)
*H04W 4/80* (2018.01)
*H04L 29/08* (2006.01)

(52) U.S. Cl.
CPC ........ *H04L 63/102* (2013.01); *H04L 63/0853* (2013.01); *H04L 65/403* (2013.01); *H04L 67/02* (2013.01); *H04W 4/80* (2018.02)

(58) Field of Classification Search
CPC ..... H04L 67/02; H04L 63/102; H04L 65/403; H04L 63/0853; H04L 63/0807; H04L 65/1093; H04W 4/80; H04W 4/023
USPC .......................................................... 726/4
See application file for complete search history.

(56) References Cited

U.S. PATENT DOCUMENTS

| | | | |
|---|---|---|---|
| 9,374,369 B2 | 6/2016 | Mahaffey et al. | |
| 9,396,598 B2 | 7/2016 | Daniel-Wayman et al. | |
| 9,479,937 B2 | 10/2016 | O'Toole et al. | |
| 2013/0263020 A1* | 10/2013 | Heiferman | H04L 12/1818 715/753 |
| 2016/0119258 A1* | 4/2016 | Uzelac | H04L 65/1069 715/752 |
| 2018/0183806 A1* | 6/2018 | Nambisan | H04L 41/0893 |
| 2020/0366629 A1* | 11/2020 | Jalil | G06Q 10/101 |

FOREIGN PATENT DOCUMENTS

WO 201603538 A1 3/2016

* cited by examiner

*Primary Examiner* — Frantz B Jean
(74) *Attorney, Agent, or Firm* — Merchant & Gould P.C.

(57) ABSTRACT

Seamless guest access to spaces and meetings may be provided. A trusted user device may send an identity object and may receive an identifier and an authorization token in response to sending the identity object. Then the trusted user device may send a request to add a guest user associated with the identifier to a collaboration event and may receive, in response to sending the request to add the guest user, location data associated with the collaboration event. The trusted user device may then send collaboration space data to a guest user device associated with the guest user. The collaboration space data may comprise the authorization token, the location data, and an application indicator associated with the collaboration event.

20 Claims, 8 Drawing Sheets

SEAMLESS GUEST ACCESS TO SPACES AND MEETINGS

TECHNICAL FIELD

The present disclosure relates generally to access to spaces and meetings.

BACKGROUND

A collaboration tool helps people to collaborate. The purpose of a collaboration tool is to support a group of two or more individuals to accomplish a common goal or objective. Collaboration tools may be either of a non-technological nature such as paper, flipcharts, post-it notes, or whiteboards. They can also include software tools and applications such as collaborative software applications.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
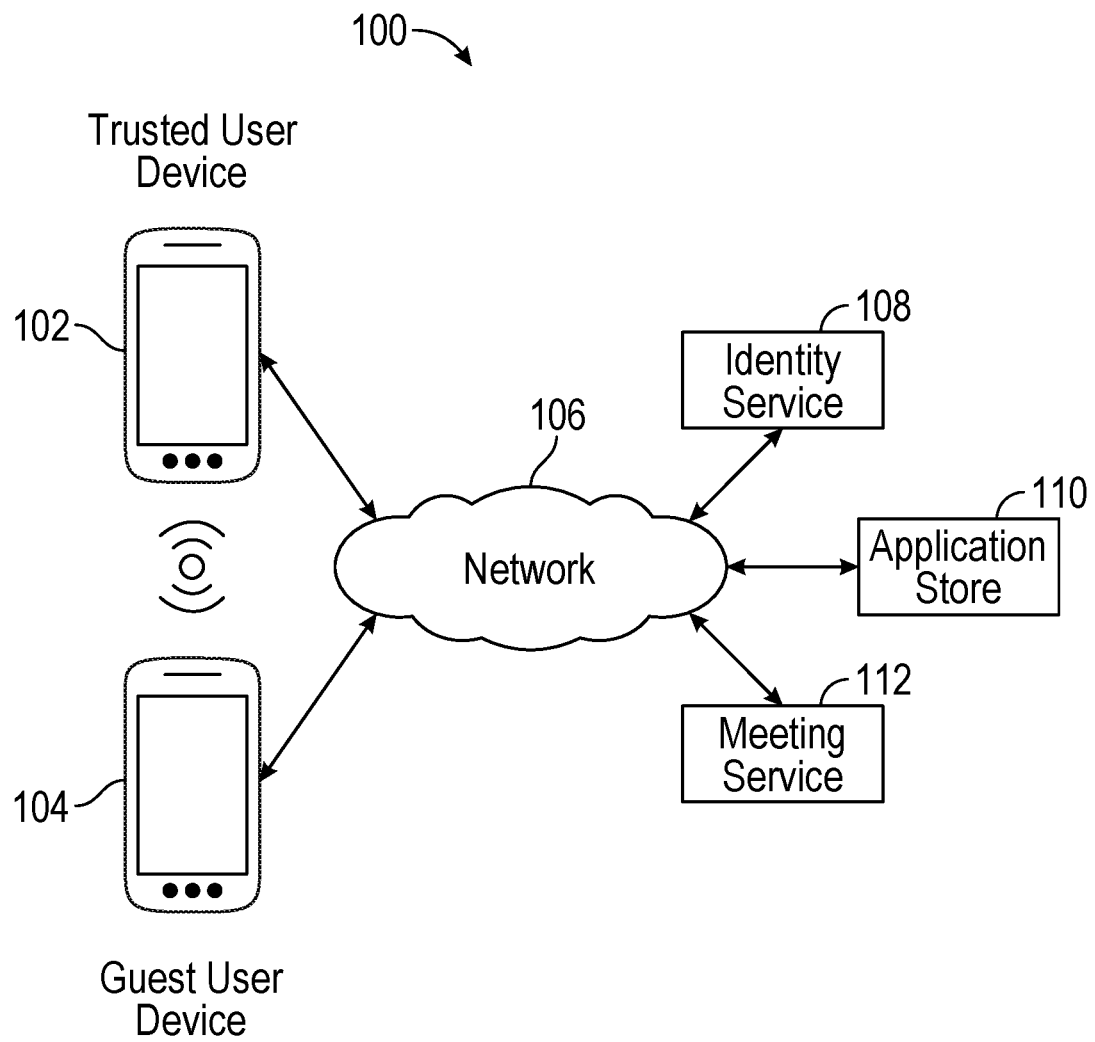
FIG. 1 shows an operating environment for providing seamless guest access to spaces and meetings.

Seamless guest access to spaces and meetings may be provided. A trusted user device may send an identity object and may receive an identifier and an authorization token in response to sending the identity object. Then the trusted user device may send a request to add a guest user associated with the identifier to a collaboration event and may receive, in response to sending the request to add the guest user, location data associated with the collaboration event. The trusted user device may then send collaboration space data to a guest user device associated with the guest user. The collaboration space data may comprise the authorization token, the location data, and an application indicator associated with the collaboration event.

Both the foregoing overview and the following example embodiments are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

On-demand collaboration, online meetings, web conferencing, and videoconferencing may be provided by network conferencing applications. In addition, network conferencing applications may interconnect various users over a computer network for video, audio, and/or data communications. A host organizing a meeting may define two levels of attendees: required and optional. When a meeting is created, authorized attendees may receive an invitation in an email or other message. The invitation may have a Uniform Resource Locator (URL) or clickable link for joining the meeting. However, some users may later misplace or otherwise be unable to access the invitation at the time of the meeting. Other users may decide not to attend the meeting, thus may delete the invitation. Regardless of the reason, a user may decide to participate in a meeting, but may have limited or no access to the invitation. Notwithstanding, inviting guest users to team spaces and meetings may be a difficult and time consuming process relying on emailing invitations, clicking email links, online registration, and password setting. Making the invitation experience more effortless for the user may create a situation in which users may be more likely to create, accept, and utilize invitations.

FIG. 1 shows an operating environment 100 consistent with embodiments of the disclosure for providing seamless guest access to spaces and meetings. As shown in FIG. 1, operating environment 100 may comprise a trusted user device 102, a guest user device 104, a network 106, an identity service 108, an application store 110, and a meeting service 112. Trusted user device 102 and guest user device 104 may comprise, but are not limited to, a mobile device, a smart phone, a personal computer, a tablet device, a cable modem, a cellular base station, a telephone, a remote control device, a set-top box, a digital video recorder, an internet of things (IoT) device, a network computer, a mainframe, a router, or other similar microcomputer-based device.

Meeting service 112 may comprise a device or devices that may provide or host a collaboration event consistent with embodiments of the discourse. Identity service 108 may comprise a device or devices that may provide validation of the identity of users such as a guest user to a collaboration event consistent with embodiments of the disclosure. Application store 110 may comprise a device or devices where the guest user may go to in order to download an application, for example, for the collaboration event on guest user device 104. Network 106 may comprise any network (e.g., the Internet) over which trusted user device 102, guest user device 104, identity service 108, application store 110, and meeting service 112 may communicate. Trusted user device 102 and guest user device 104 may wirelessly communicate directly with one another using, for example, Near-field Communication (NFC) protocol. Trusted user device 102 and guest user device 104 may wirelessly communicate using other protocols and processes and are not limited to the NFC protocol.

The elements described above of operating environment 100 (e.g., trusted user device 102, guest user device 104, identity service 108, application store 110, and meeting service 112) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 6, the elements of operating environment 100 may be practiced in a computing device 600.

Figure 2:
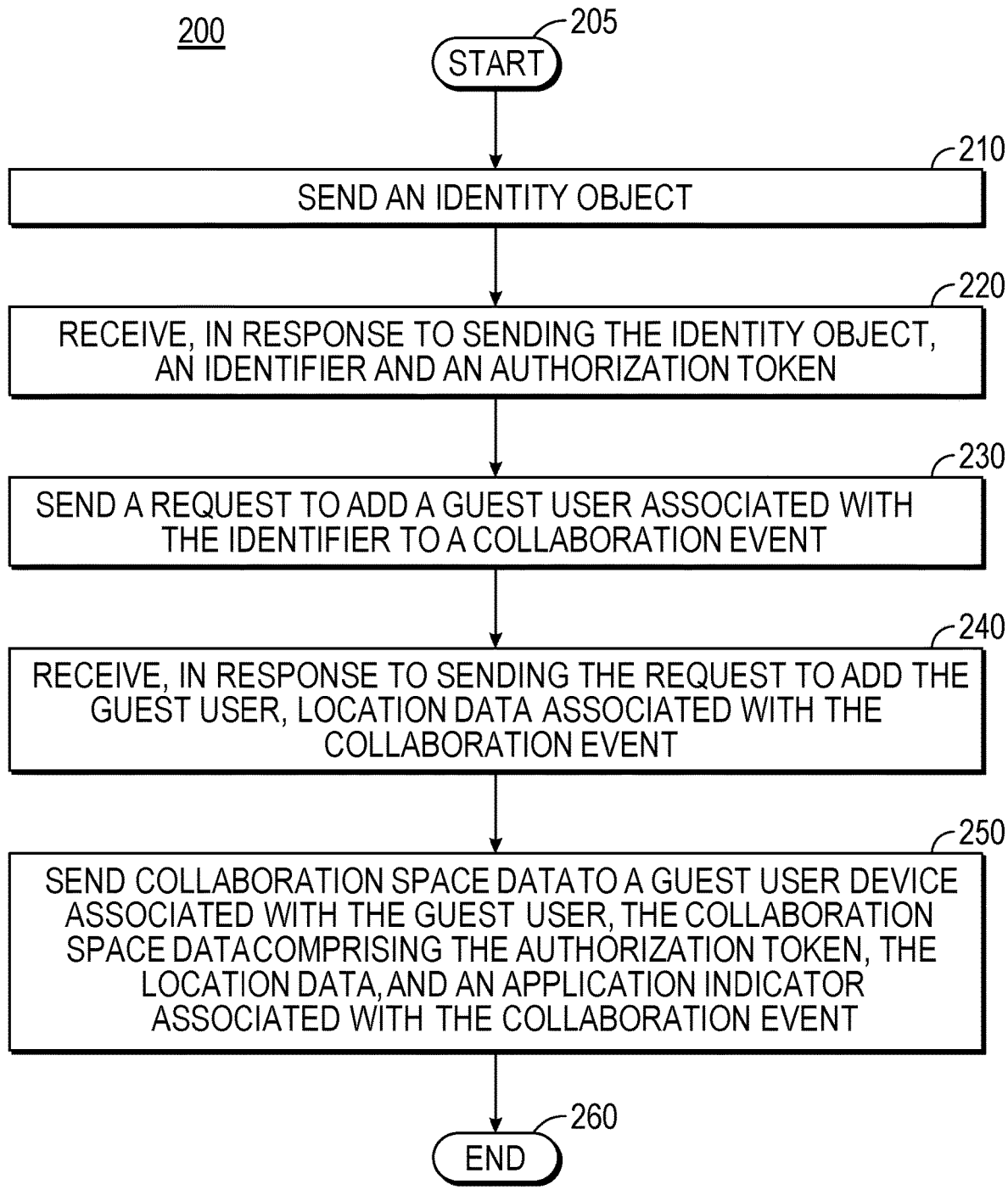
FIG. 2 is a flow chart of a method for providing seamless guest access to spaces and meetings.
Figure 3A:
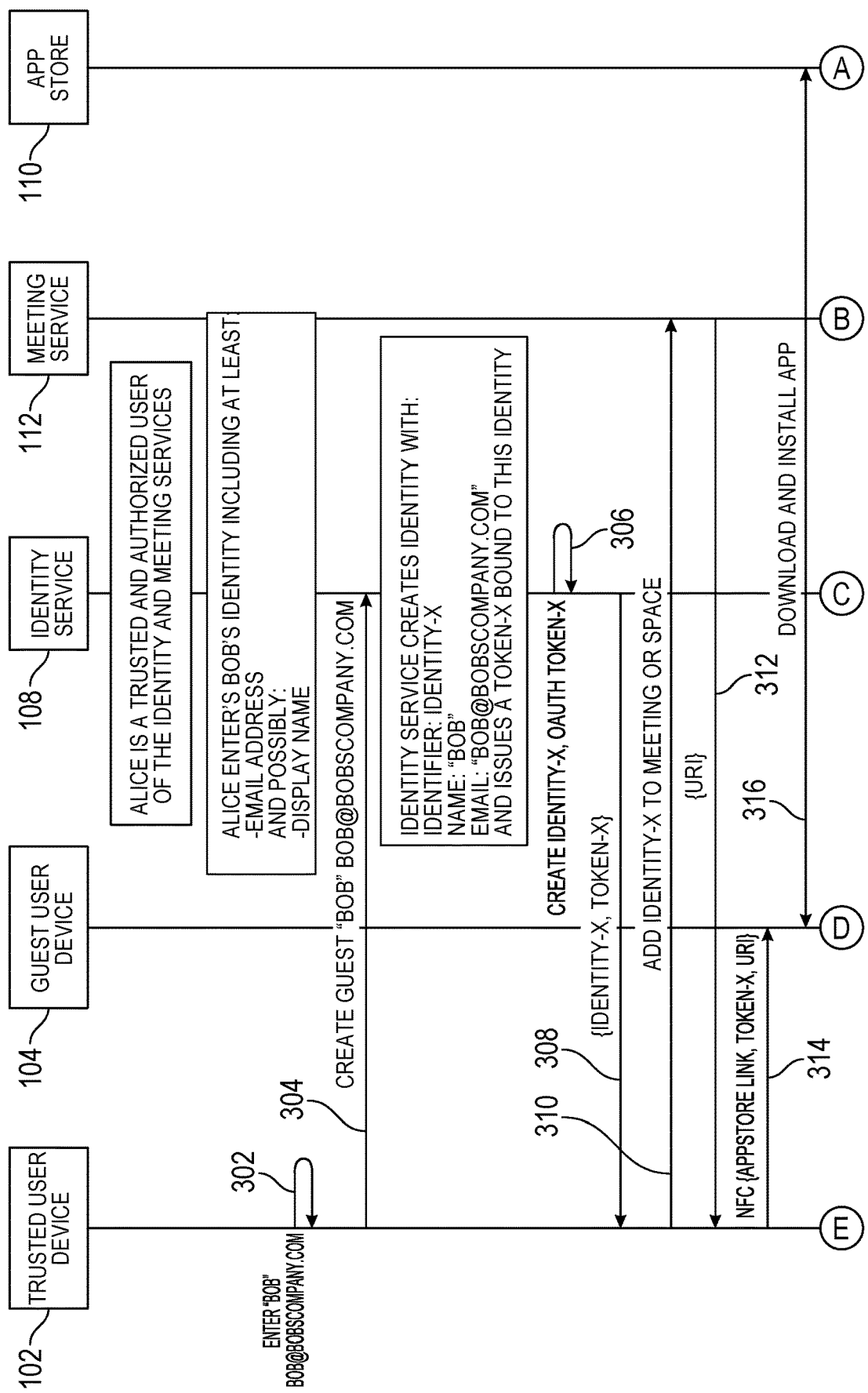
FIG. 3A and FIG. 3B show a flow diagram for providing seamless guest access to spaces and meetings.
Figure 3B:
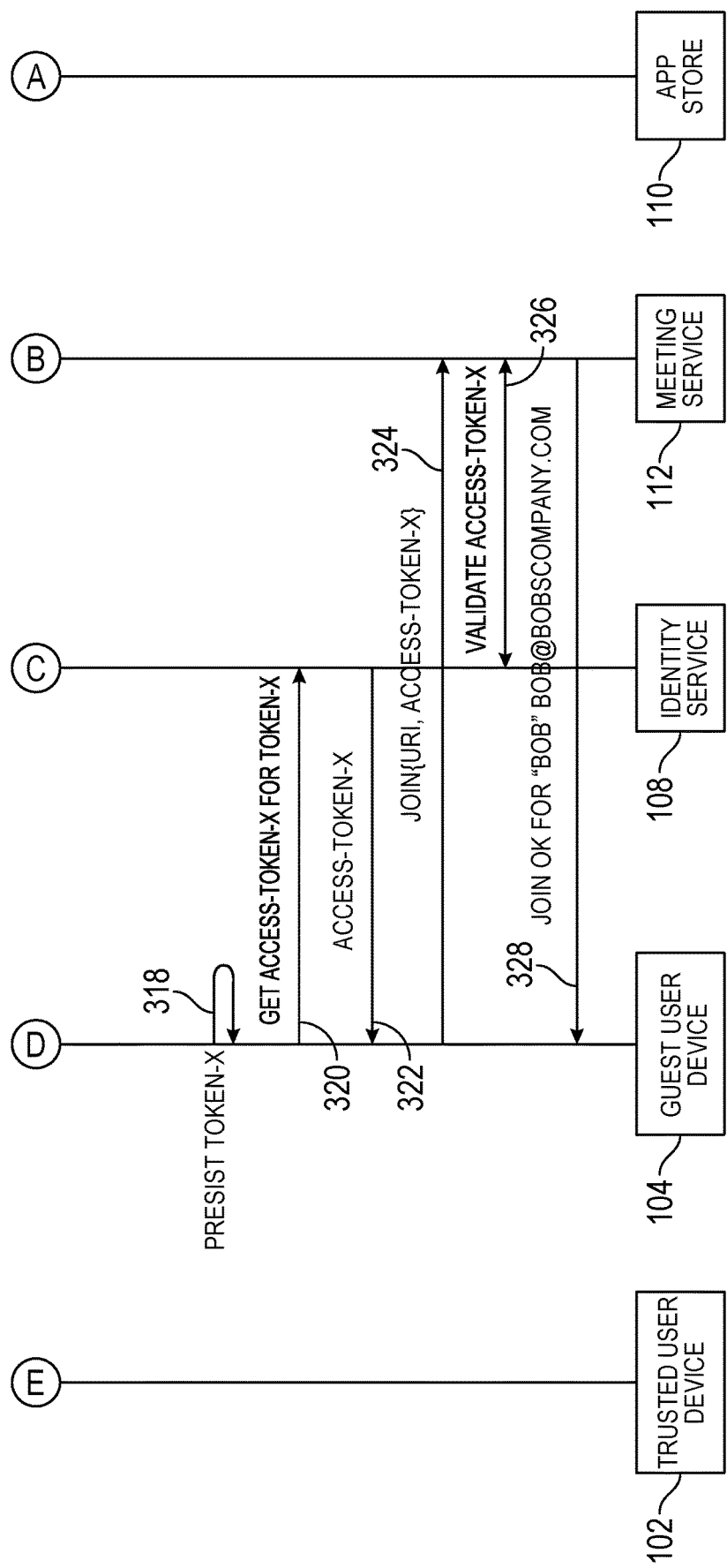
Figure 4A:
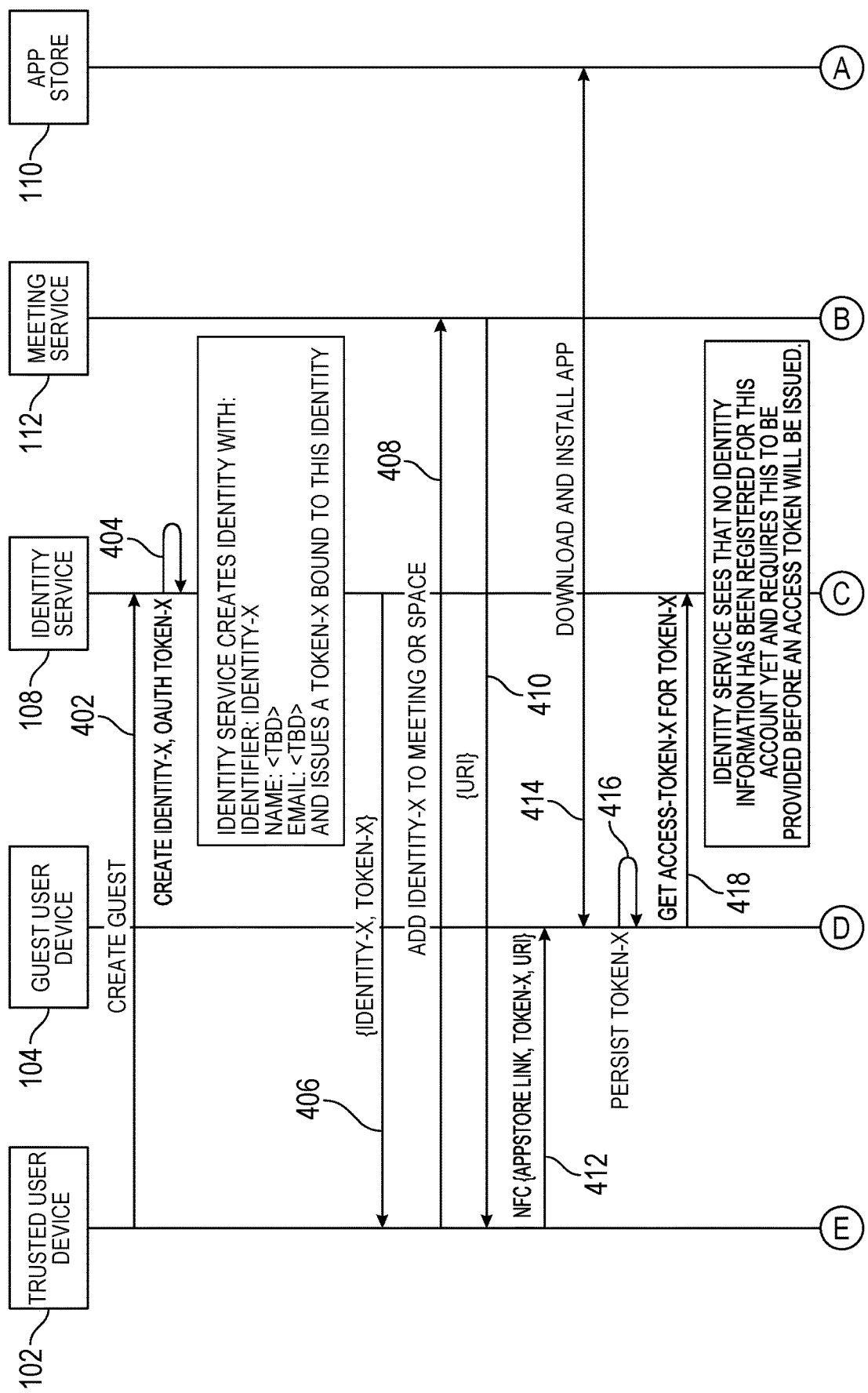
FIG. 4A and FIG. 4B show a flow diagram for providing seamless guest access to spaces and meetings.
Figure 4B:
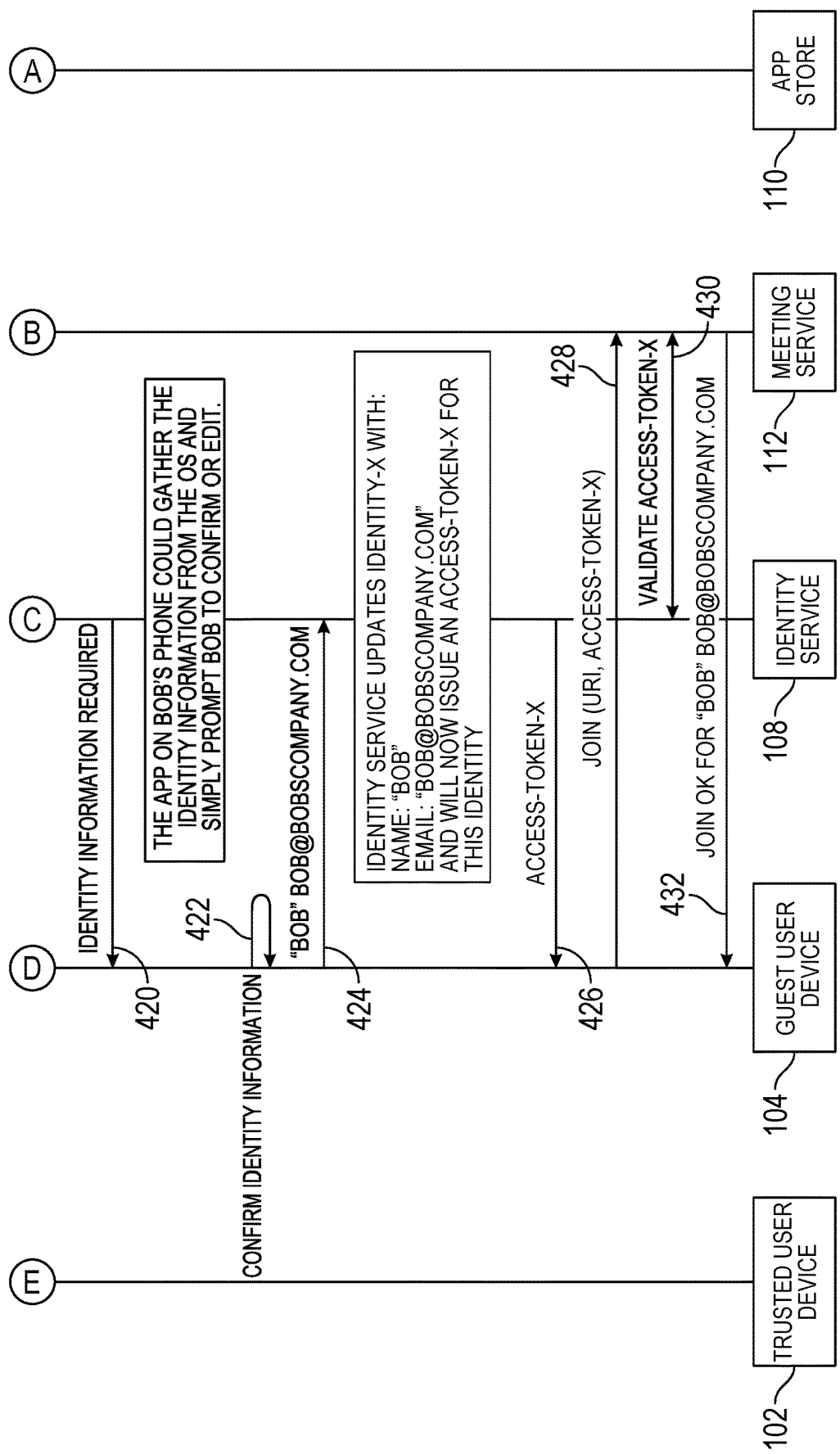

FIG. 2 is a flow chart setting forth the general stages involved in a method 200 consistent with embodiments of the disclosure for providing seamless guest access to spaces and meetings. Method 200 may be implemented using trusted user device 102 as described in more detail above with respect to FIG. 1. Ways to implement the stages of method 200 will be described in greater detail below. Method 200 will be described in conjunction with the flow diagrams of FIG. 3A, FIG. 3B, FIG. 4A, and FIG. 4B. The flow diagram of FIG. 3A and FIG. 3B illustrates embodiments of the disclosure in which a trusted user provides identity information associated with a guest user. The flow diagram of FIG. 4A and FIG. 4B illustrates embodiments of the disclosure in which the trusted user does not provide identity information associated with the guest user.

Method 200 may begin at starting block 205 and proceed to stage 210 where trusted user device 102 may send an identity object. For example, Alice may be a trusted and authorized user of identity service 108 and meeting service 112 who wants to invite a guest user (e.g., Bob) to a collaboration event. Bob may not yet be a trusted and authorized user of identity service 108 and meeting service 112. The collaboration event may comprise, but is not limited to, a collaboration space or a collaboration meeting. Alice may have an application running on trusted user device 102 and may use the application to send the identity object to identity service 108. In some embodiments of the disclosure, the trusted user (e.g., Alice) may enter the guest user's (e.g., Bob's) identity information into the application (stage 302 of FIG. 3A). The identity information may comprise, but is not limited to, the guest user's email address and display name. The identity object, including the guest user's identity information may then be sent to identity service 108 (stage 304 of FIG. 3A). In other embodiments, the trusted user may not enter the guest user's identity information. In these other embodiments, the identity object, not including the guest user's identity information, may be sent to identity service 108 (stage 402 of FIG. 4A).

From stage 210, where trusted user device 102 sends the identity object, method 200 may advance to stage 220 where trusted user device 102 may receive, in response to sending the identity object, an identifier and an authorization token. For example, upon receiving the identity object from trusted user device 102, identity service 108 may create an identifier and an authorization token for the guest user. With embodiments of the disclosure where the identity object included the guest user's identity information, identity service 108 may create an identity for the guest user that has the identifier and the guest user's identity information (stage 306 of FIG. 3A). With embodiments of the disclosure where the identity object did not include the guest user's identity information, identity service 108 may create an identity for the guest user that has the identifier, but has place holders (i.e., To Be Determined (TBD)) for the guest user's identity information (stage 404 of FIG. 4A). Identity service 108 may then send the identifier and the authorization token to trusted user device 102 (stage 308 of FIG. 3A and stage 406 of FIG. 4A).

Once trusted user device 102 receives the identifier and the authorization token in stage 220, method 200 may continue to stage 230 where trusted user device 102 may send a request to add the guest user associated with the identifier to a collaboration event. For example, the trusted user may cause trusted user device 102 to send the received identifier to meeting services 112 in a request to add the guest user to the collaboration event (e.g., meeting, space, etc.) (stage 310 of FIG. 3A and stage 408 of FIG. 4A).

After trusted user device 102 sends the request to add the guest user in stage 230, method 200 may proceed to stage 240 where trusted user device 102 may receive, in response to sending the request to add the guest user, location data associated with the collaboration event. For example, upon receiving the request to add the guest user from trusted user device 102, meeting services 112 may send location data associated with the collaboration event to trusted user device 102 (stage 312 of FIG. 3A and stage 410 of FIG. 4A). The location data may comprise, but is not limited to, an address or a Uniform Resource Locator (URL) for the collaboration event (e.g., meeting, space, etc.). Notwithstanding, the location data may comprise any data that may be used by guest user device 104 to get to the collaboration event.

From stage 240, where trusted user device 102 receives the location data, method 200 may advance to stage 250 where trusted user device 102 may send collaboration space data to guest user device 104 associated with the guest user. The collaboration space data may comprise the authorization token, the location data, and an application indicator associated with the collaboration event. For example, the trusted user (e.g., Alice) may place trusted user device 102 near guest user device 104 (i.e., "tap" guest user device 104) causing the collaboration space data to be transmitted to guest user device 104 over a Near-field Communication (NFC) protocol (stage 314 of FIG. 3A and stage 412 of FIG. 4A). Other processes may be used to send the collaboration space data to guest user device 104 and embodiments of the disclosure are not limited to NFC. The application indicator associated with the collaboration event may comprise, but is not limited to, a link to application store 110 where the guest user may go to on guest user device 104 in order to download an application for the collaboration event on guest user device 104. Once trusted user device 102 sends the collaboration space data to guest user device 104 in stage 250, method 200 may then end at stage 260.

Figure 5:
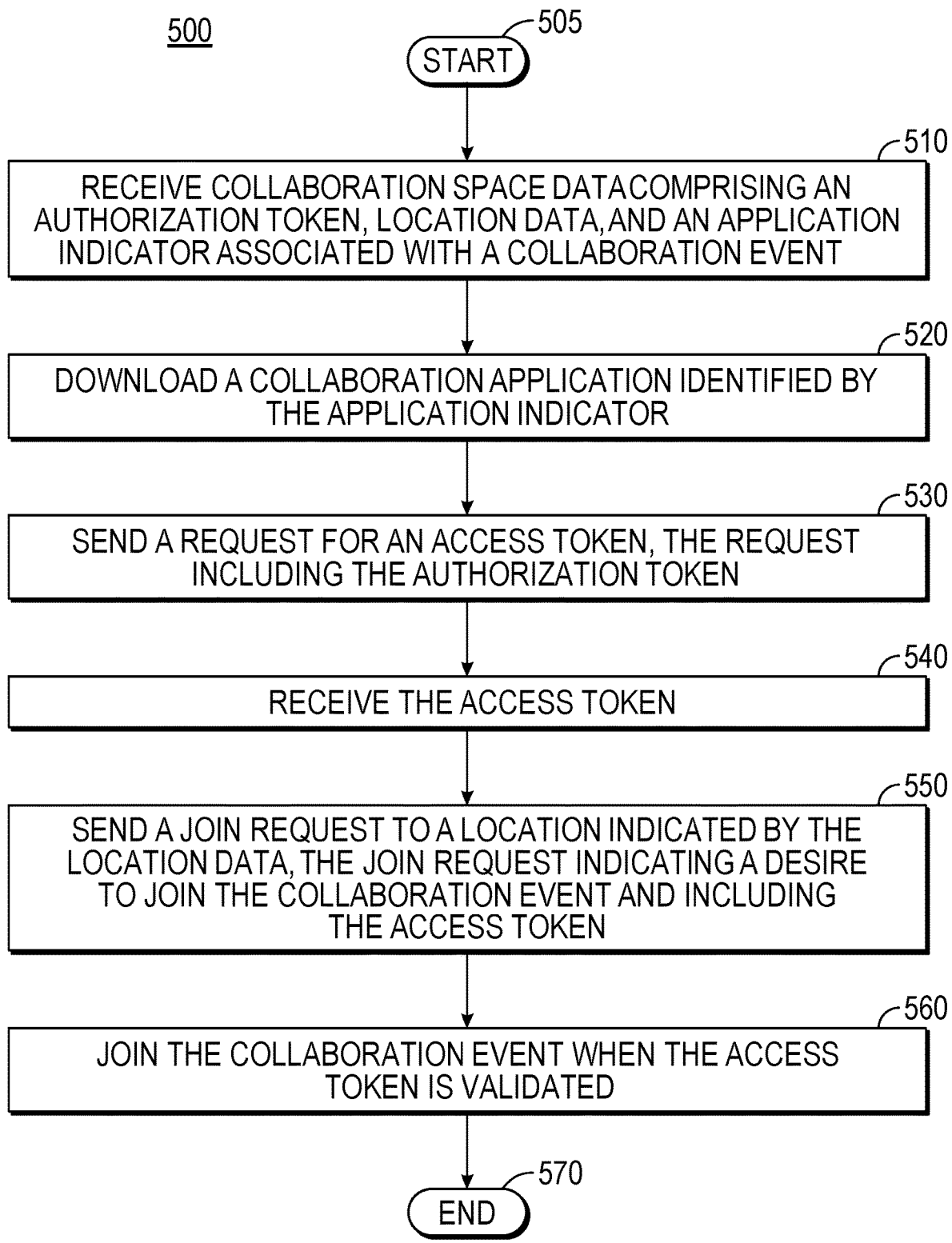
FIG. 5 is a flow chart of a method for providing seamless guest access to spaces and meetings.

FIG. 5 is a flow chart setting forth the general stages involved in a method 500 consistent with embodiments of the disclosure for providing seamless guest access to spaces and meetings. Method 500 may be implemented using guest user device 104 as described in more detail above with respect to FIG. 1. Ways to implement the stages of method 500 will be described in greater detail below. Method 500 will be described in conjunction with the flow diagrams of FIG. 3A, FIG. 3B, FIG. 4A, and FIG. 4B. The flow diagram of FIG. 3A and FIG. 3B illustrates embodiments of the disclosure in which a trusted user provides identity information associated with a guest user. The flow diagram of FIG. 4A and FIG. 4B illustrates embodiments of the disclosure in which the trusted user does not provide identity information associated with the guest user.

Method 500 may begin at starting block 505 and proceed to stage 510 where guest user device 104 may receive the collaboration space data comprising the authorization token, the location data, and the application indicator associated with the collaboration event. For example, trusted user device 102 may send the collaboration space data to guest user device 104 associated with the guest user over NFC.

From stage 510, where guest user device 104 receives the collaboration space data, method 500 may advance to stage 520 where guest user device 104 may download a collaboration application identified by the application indicator. For example, the application indicator associated with the collaboration event may comprise, but is not limited to, a link to application store 110 where the guest user may go to on guest user device 104 in order to download an application for the collaboration event on guest user device 104. Using this link, the guest user may go to the application store and download the application on guest user device 104 (stage 316 of FIG. 3A and stage 414 of FIG. 4A).

Once guest user device 104 downloads the collaboration application identified by the application indicator in stage 520, method 500 may continue to stage 530 where guest user device 104 may send a request for an access token. The request may include the authorization token. For example, using guest user device 104, the guest user may persist the authorization token received in the collaboration space data (stage 318 of FIG. 3B and stage 416 of FIG. 4A). Then the guest user may send the persisted authorization token to identity service 108 as a request for the access token for joining the collaboration event (stage 320 of FIG. 3B and stage 418 of FIG. 4A).

With embodiments of the disclosure in which the trusted user does not provide identity information associated with the guest user, the guest user may provide the identity information at this point in the process. For example, the trusted user (e.g., Alice) may have the identity object created for the guest user (e.g., Bob) without providing personal identity information for the guest user as described above with respect to stages 210 and 220. Identity service 108 may issue a token bound to this identity, and the bearer of this token (e.g., the guest user) may specify their own identity information (e.g., email address) when the bearer first use the token. This process may allow a seamless User Interface (UX) for the trusted user in the example case where the trusted user may want to add many guest users in one physical conference room. In this example, the trusted user may walk around the conference room tapping the guest users' user devices without having to enter any information about the guest users. The guest users may then confirm their identity information before they can join the collaboration event.

In the case where the trusted user does not provide identity information for the guest user, identity service 108 may see that no identity information has been registered for the account associated with the identity token and may require identity information to be provided before the access token can be issued. Accordingly, identity service 108 may send guest user device 104 a request to provide the identity information (stage 420 of FIG. 4B). With some embodiments of the disclosure, the application on guest user device 104 may gather the identity information from guest user device 104's operating system (OS) and prompt the guest user to confirm or edit for example (stage 422 of FIG. 4B). In response to the confirmation, guest user device 104 may send the identity information to identity service 108 (stage 424 of FIG. 4B). The identity information may comprise, but is not limited to, the guest user's email address and display name. Identity service 108 may update the identity for the guest user with the identity information and may now be able to issue the access token for this identity.

After guest user device 104 sends the request for the access token in stage 530, method 500 may proceed to stage 540 where guest user device 104 may receive the access token. For example, in response to receiving the request for the access token from guest user device 104 (and after obtaining any needed identity information), identity service 108 may send guest user device 104 the access token (stage 322 of FIG. 3B and stage 426 of FIG. 4B).

From stage 540, where guest user device 104 receives the access token, method 500 may advance to stage 550 where guest user device 104 may send, via the application, a join request to the location indicated by the location data. The join request may indicate a desire to join the collaboration event and may include the access token. For example, guest user device 104 may send the join request including the access token to the URL associated with the location data (stage 324 of FIG. 3B and stage 428 of FIG. 4B).

After guest user device 104 sends the join request in stage 550, method 500 may proceed to stage 560 where guest user device 104 may join the collaboration event when the access token is validated. For example, meeting service 112 may validate the access token (stage 326 of FIG. 3B and stage 430 of FIG. 4B). When the access token has been validated, meeting service 112 may allow guest user device 104 to join the collaboration event (stage 328 of FIG. 3B and stage 432 of FIG. 4B). Once guest user device 104 joins the collaboration event in stage 560, method 500 may then end at stage 570.

Figure 6:
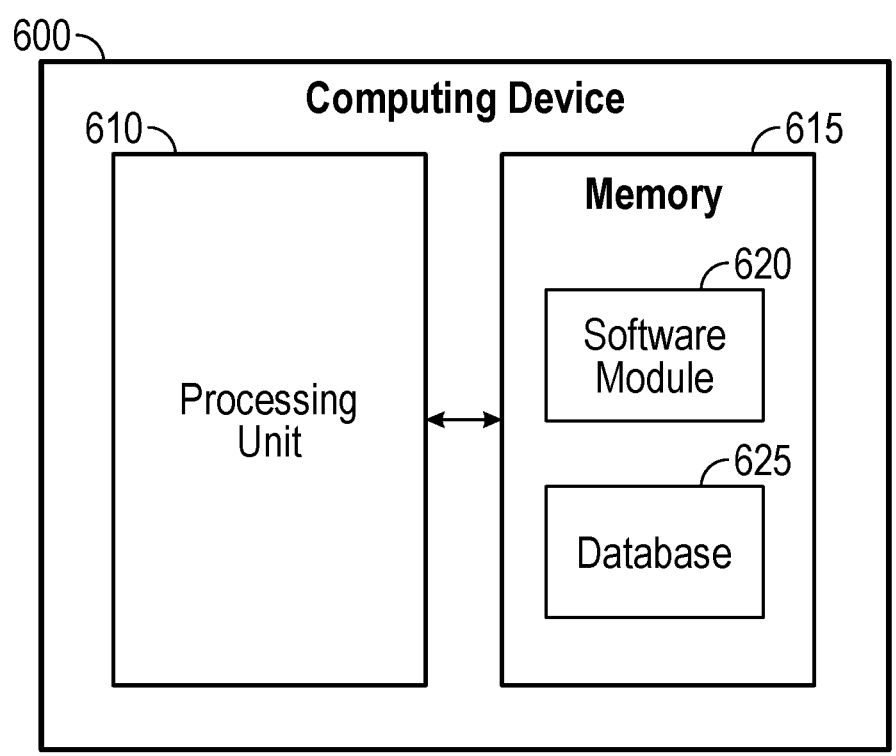
FIG. 6 shows a computing device.

FIG. 6 shows a computing device 600. As shown in FIG. 6, computing device 600 may include a processing unit 610 and a memory unit 615. Memory unit 615 may include a software module 620 and a database 625. While executing on processing unit 610, software module 620 may perform processes for providing seamless guest access to spaces and meetings, including for example, any one or more of the stages from method 200 described above with respect to FIG. 2 and any one or more of the stages from method 500 described above with respect to FIG. 5. Computing device 600, for example, may provide an operating environment for trusted user device 102, guest user device 104, identity service 108, application store 110, and meeting service 112. Trusted user device 102, guest user device 104, identity service 108, application store 110, and meeting service 112 may operate in other environments and are not limited to computing device 600.

Computing device 600 may be implemented using a Wireless Fidelity (Wi-Fi) access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 600 may comprise any computer operating environment, such as hand-held devices, multi-processor systems, microprocessor-based or programmable sender electronic devices, minicomputers, mainframe computers, and the like. Computing device 600 may also be practiced in distributed computing environments where tasks are performed by remote processing devices. The aforementioned systems and devices are examples and computing device 600 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the elements illustrated in FIG. 1 may be integrated onto a single integrated circuit. Such a SOC device may include one or more processing units, graphics units, communications units, system virtualization units and various application functionality all of which may be integrated (or "burned") onto the chip substrate as a single integrated circuit. When operating via a SOC, the functionality described herein with respect to embodiments of the disclosure, may be performed via application-specific logic integrated with other components of computing device 600 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
    sending, by an authorized user device associated with an authorized user, an identity object for adding a guest user to a collaboration meeting, wherein the authorized user is an invited user to the collaboration meeting;
    receiving, by the authorized user device in response to sending the identity object, an identifier and an authorization token;
    sending, by the authorized user device, a request to add the guest user associated with the identifier to the collaboration event;
    receiving, by the authorized user device in response to sending the request to add the guest user, location data associated with the collaboration event; and
    sending, by the trusted authorized user device, collaboration space data to a guest user device associated with the guest user, wherein sending the collaboration space data comprises:
        creating, by the authorized user device, a payload comprising the authorization token, the location data, and an application indicator associated with the collaboration event, and
        sending, by the authorized user device, the payload over a Near-field Communication (NFC) protocol to the guest user device.

2. The method of claim 1, wherein sending the identity object comprises sending the identity object including identity information of the guest user.

3. The method of claim 1, wherein sending the identity object comprises sending the identity object not including identity information of the guest user.

4. The method of claim 1, wherein sending the request to add the guest user associated with the identifier to the collaboration event comprises sending the request to add the guest user associated with the identifier to the collaboration event comprising a collaboration space.

5. The method of claim 1, wherein sending the request to add the guest user associated with the identifier to the collaboration event comprises sending the request to add the guest user associated with the identifier to the collaboration event comprising a collaboration meeting.

6. The method of claim 1, wherein receiving the location data comprises receiving the location data comprising a Uniform Resource Locator (URL).

7. The method of claim 1, wherein sending the collaboration space data comprises sending the collaboration space data wherein the application indicator comprises a link to an application store.

8. A method comprising:
receiving, by a guest user device, a payload from an authorized trusted user device over Near-field Communication (NFC) protocol, the payload comprising collaboration space data comprising an authorization token, location data, and an application indicator associated with a collaboration event;
downloading, by the guest user device, a collaboration application identified by the application indicator;
sending, by the guest user device, a request for an access token, the request including the authorization token;
receiving, by the guest user device, the access token;
sending, by the guest user device via the application, a join request to a location indicated by the location data, the join request indicating a desire to join the collaboration event and including the access token; and
joining the collaboration event when the access token is validated.

9. The method of claim 8, further comprising:
receiving, by the guest user device in response to sending the request for the access token, a request for identity information associated with a guest user associated with the guest user device; and
sending, by the guest user device in response to receiving the request for the identity information, the identity information associated with the guest user, wherein receiving the access token comprises receiving the access token in response to sending the identity information.

10. The method of claim 8, wherein receiving the access token comprises receiving the access token in response to sending the request for the access token.

11. The method of claim 8, wherein receiving the collaboration space data comprising the application indicator associated with the collaboration event comprises receiving the collaboration space data comprising the application indicator associated with the collaboration event wherein the collaboration event comprises a collaboration space.

12. The method of claim 8, wherein receiving the collaboration space data comprising the application indicator associated with the collaboration event comprises receiving the collaboration space data comprising the application indicator associated with the collaboration event wherein the collaboration event comprises a collaboration meeting.

13. The method of claim 8, wherein receiving the collaboration space data comprising the location data comprises receiving the collaboration space data comprising the location data comprising a Uniform Resource Locator (URL).

14. An apparatus comprising:
a memory storage; and
a processing unit coupled to the memory storage, wherein the processing unit is operative to:
send an identity object for adding a guest user to a collaboration meeting, wherein the authorized user is an invited user to the collaboration meeting;
receive, in response to sending the identity object, an identifier and an authorization token;
send a request to add the guest user associated with the identifier to the collaboration event;
receive, in response to sending the request to add the guest user, location data associated with the collaboration event; and
send collaboration space data to a guest user device associated with the guest user, the collaboration space data, wherein the processing unit being operative to send the collaboration data comprises the processing unit being operative to:
create a payload comprising the authorization token, the location data, and an application indicator associated with the collaboration event, and
send the payload over a Near-field Communication (NFC) protocol the guest user device.

15. The apparatus of claim 14, wherein the collaboration event comprises a collaboration space.

16. The apparatus of claim 14, wherein the collaboration event comprises a collaboration meeting.

17. The apparatus of claim 14, wherein the application indicator comprises a link to an application store.

18. The method of claim 1, wherein sending, by the authorized user device associated with the authorized user, the identity object comprises sending, by the authorized user device associated with the authorized user, the identity object using an application associated the collaboration event installed on the authorized user device.

19. The method of claim 1, wherein sending, by the authorized user device associated with the authorized user, the identity object comprises sending, by the authorized user device associated with the authorized user, the identity object not comprising a user identification of the guest user.

20. The method of claim 1, wherein receiving, by the authorized user device in response to sending the identity object, the authorization token comprises receiving, by the authorized user device in response to sending the identity object, the authorization token granting an authorization to the guest user for installation and use of an application associated with the collaboration event.

* * * * *